United States Patent
Macary et al.

(10) Patent No.: US 12,544,326 B2
(45) Date of Patent: Feb. 10, 2026

(54) PERSONAL CARE PRODUCT AND A METHOD FOR MAKING A PERSONAL CARE PRODUCT BY AN ADDITIVE PROCESS

(71) Applicant: Henkel AG & Co. KGaA, Duesseldorf (DE)

(72) Inventors: Jennifer Sullivan Macary, Danbury, CT (US); Jeffrey S. Bankers, Stamford, CT (US)

(73) Assignee: Henkel AG & Co. KGaA, Düsseldorf (DE)

( * ) Notice: Subject to any disclaimer, the term of this patent is extended or adjusted under 35 U.S.C. 154(b) by 567 days.

(21) Appl. No.: 17/898,376

(22) Filed: Aug. 29, 2022

(65) Prior Publication Data

US 2022/0409495 A1 Dec. 29, 2022

Related U.S. Application Data

(63) Continuation of application No. PCT/US2021/020241, filed on Mar. 1, 2021.

(60) Provisional application No. 62/706,606, filed on Aug. 28, 2020, provisional application No. 62/706,607, filed on Aug. 28, 2020, provisional application No. 62/982,471, filed on Feb. 27, 2020.

(51) Int. Cl.

| | |
|---|---|
| *A61K 8/11* | (2006.01) |
| *A61K 8/02* | (2006.01) |
| *A61K 8/34* | (2006.01) |
| *A61K 8/36* | (2006.01) |
| *A61K 8/41* | (2006.01) |
| *A61K 8/44* | (2006.01) |
| *A61K 8/73* | (2006.01) |
| *A61Q 5/02* | (2006.01) |
| *A61Q 5/12* | (2006.01) |
| *A61Q 19/10* | (2006.01) |
| *B29C 64/106* | (2017.01) |
| *B29C 64/165* | (2017.01) |
| *B29K 105/00* | (2006.01) |
| *B29L 31/00* | (2006.01) |
| *B33Y 10/00* | (2015.01) |
| *B33Y 70/00* | (2020.01) |
| *B33Y 80/00* | (2015.01) |

(52) U.S. Cl.
CPC ............ *A61K 8/732* (2013.01); *A61K 8/0233* (2013.01); *A61K 8/11* (2013.01); *A61K 8/345* (2013.01); *A61K 8/361* (2013.01); *A61K 8/416* (2013.01); *A61K 8/44* (2013.01); *A61Q 5/02* (2013.01); *A61Q 5/12* (2013.01); *A61Q 19/10* (2013.01); *B29C 64/106* (2017.08); *B29C 64/165* (2017.08); *A61K 2800/30* (2013.01); *A61K 2800/5424* (2013.01); *A61K 2800/614* (2013.01); *A61K 2800/622* (2013.01); *A61K 2800/624* (2013.01); *B29K 2105/0011* (2013.01); *B29K 2403/00* (2013.01); *B29L 2031/718* (2013.01); *B33Y 10/00* (2014.12); *B33Y 70/00* (2014.12); *B33Y 80/00* (2014.12)

(58) Field of Classification Search
CPC ........ A61K 8/732; A61K 8/0233; A61K 8/11; A61K 8/345; A61K 8/361; A61K 8/416; A61K 8/44
See application file for complete search history.

(56) References Cited

U.S. PATENT DOCUMENTS

| | | | |
|---|---|---|---|
| 2,871,161 | A | 1/1959 | Spiegel |
| 3,277,013 | A | 10/1966 | Gianladis |
| 4,035,267 | A | 7/1977 | Gleckler et al. |
| 4,072,535 | A | 2/1978 | Short et al. |
| 5,700,455 | A | 12/1997 | Hinterwaldner et al. |
| 5,872,087 | A | 2/1999 | Neelakantan |
| 6,165,453 | A | 12/2000 | Buheitel |
| 8,449,895 | B1 | 5/2013 | Koiteh |
| 9,566,228 | B2 | 2/2017 | Jeong |
| 9,669,241 | B2 | 6/2017 | Wycoff et al. |
| 9,816,058 | B2 | 11/2017 | Rives |
| 9,993,404 | B2 | 6/2018 | Callens et al. |
| 2002/0068084 | A1 | 6/2002 | Staniforth |
| 2003/0108505 | A1 | 6/2003 | Cao et al. |
| 2004/0147189 | A1 | 7/2004 | Smith, III et al. |
| 2004/0180027 | A1* | 9/2004 | Kumar et al. |

(Continued)

FOREIGN PATENT DOCUMENTS

| | | |
|---|---|---|
| CN | 106511285 B | 6/2019 |
| DE | 10128799 A1 | 1/2003 |

(Continued)

OTHER PUBLICATIONS

Stansbury et al., (3D printing with polymers: Challenges among expanding options and opportunities) 2016, Elsevier, Science Direct, 54-64 (Year: 2016).*

(Continued)

*Primary Examiner* — Robert A Wax
*Assistant Examiner* — Kimberly Barber
(74) *Attorney, Agent, or Firm* — Blank Rome LLP (57) ABSTRACT

Methods for making a personal care product and a personal care product are provided. In one example, the method includes forming a first layer by an additive process. The first layer has a first composition that includes at least one filler component selected from the group of starch, bulking agent salt, granular acid, clay mineral, sorbitol, silica, titanium dioxide, and zinc oxide. A binder is applied to the first layer. A second layer is formed by the additive process overlying the binder. The second layer has a second composition that includes at least one filler component selected from the group of starch, bulking agent slat, granular acid, clay mineral, sorbitol, silica, titanium dioxide, and zinc oxide. At least one of the first composition and the second composition further includes at least one surfactant.

20 Claims, 2 Drawing Sheets

(56) References Cited

U.S. PATENT DOCUMENTS

| | | |
|---|---|---|
| 2006/0058207 A1 | 3/2006 | Shaw et al. |
| 2006/0162097 A1 | 7/2006 | Schmenger et al. |
| 2006/0246025 A1 | 11/2006 | Hayes et al. |
| 2008/0260918 A1 | 10/2008 | Lai et al. |
| 2010/0278886 A1 | 11/2010 | Yu et al. |
| 2011/0189246 A1 | 8/2011 | Glenn, Jr. et al. |
| 2015/0366327 A1 | 12/2015 | LaHood, Sr. et al. |
| 2016/0088920 A1 | 3/2016 | LaHood, Sr. et al. |
| 2016/0128944 A1 | 5/2016 | Chawrai et al. |
| 2016/0317396 A1 | 11/2016 | Perfitt et al. |
| 2017/0014313 A1 | 1/2017 | Stern et al. |
| 2017/0232676 A1* | 8/2017 | Jaunet et al. |
| 2018/0160720 A1 | 6/2018 | Von Hasseln |
| 2019/0008751 A1 | 1/2019 | Mustafa et al. |
| 2019/0125681 A1 | 5/2019 | Albed Alhnan |
| 2019/0365623 A1 | 12/2019 | Botto et al. |
| 2022/0401342 A1 | 12/2022 | Savaides et al. |
| 2022/0409495 A1 | 12/2022 | Macary et al. |
| 2023/0000753 A1 | 1/2023 | Macary et al. |

FOREIGN PATENT DOCUMENTS

| | | | |
|---|---|---|---|
| DE | 102017215011 A1 | | 6/2018 |
| EP | 0159631 A2 | | 10/1985 |
| EP | 2509564 B1 | | 11/2013 |
| EP | 2865423 A2 | | 4/2015 |
| JP | 2016519661 | * | 7/2016 |
| WO | WO1999033654 | * | 7/1999 |
| WO | 0101954 A1 | | 1/2001 |
| WO | 2012012084 A2 | | 1/2012 |
| WO | 2013025761 A1 | | 2/2013 |
| WO | 2014144512 A1 | | 9/2014 |
| WO | 2014182989 A1 | | 11/2014 |
| WO | 2015031102 A2 | | 3/2015 |
| WO | 2016020454 A1 | | 2/2016 |
| WO | 2017196818 A1 | | 11/2017 |
| WO | 2019001940 A1 | | 1/2019 |
| WO | 2019243802 A1 | | 12/2019 |

OTHER PUBLICATIONS

Nouryon, "Tapioca Pure," Nouryon Product Data Sheet, Apr. 22, 2019, surfacechemistry.nouryon.com.

Nouryon, "Tapioca Pure Starch," Nouryon Product Data Sheet, Date unknown, PersonalCare.Marketing@nouryon.com.

Actera Ingredients, "TeraSorb™," Actera Ingredients Product Data Sheet, Date unknown, www.acteraingredients.com.

Actera Ingredients, Certificate of Analysis, Lot No. G38114901, Manufacturing date of Sep. 18, 2016.

Phillips II, Llewellyn, et al. "A comparison of rabbit and human skin response to certain irritants." Toxicology and Applied Pharmacology 21.3 (1972): 369-382.

Lanman, B. M., W. B. Elvers, and C. J. Howard. "The role of human patch testing in a product development program." Joint Conference on Cosmetic Sciences, The Toilet Goods Association (currently, the Cosmetic, Toiletry and Fragrance Association), Washington, DC. 1968.

PCT International Search Report & Written Opinion issued in PCT/US2021/020214, dated Jun. 23, 2021.

PCT International Search Report & Written Opinion issued in PCT/US2021/020241, dated Jun. 21, 2021.

PCT International Search Report & Written Opinion issued in PCT/US2021/020261, dated Jun. 23, 2021.

Extended EP Search Report issued in EP 21760803.3, dated Mar. 20, 2024.

Extended EP Search Report issued in EP 21760804.1, dated May 22, 2024.

* cited by examiner

PERSONAL CARE PRODUCT AND A METHOD FOR MAKING A PERSONAL CARE PRODUCT BY AN ADDITIVE PROCESS

FIELD OF THE INVENTION

The technical field relates generally to additive processes and more particularly, relates to methods for making personal care products by an additive process and personal care products made by such additive processes.

BACKGROUND OF THE INVENTION

Personal care products such as cleansing products are conventionally produced in the form of body washes, facial washes, shampoos, or the like. These products often utilize a surfactant system(s) to remove unwanted dirt, oils, and/or residual product(s) when topically applied. Anionic surfactants are especially useful in such surfactant systems as effective cleansing agents. Conventional cleansing products are often liquid based, which leads to several disadvantages. Liquid based cleansing products can be messy, difficult to dose properly, and tend to leak during transport. These products also require higher amounts of water, thereby increasing the weight and overall carbon footprint for manufacture and transport of the products. Moreover, many cosmetic ingredients perceived as beneficial such as L-ascorbic acid (i.e., vitamin C) are susceptible to hydrolysis, and are therefore less stable in high-water systems.

Solid based cleansing products such as bar soaps and shampoo bars may allow for lower water content, but current solid based cleansing products on the market also carry disadvantages. For example, these products are perceived as harsh, messy, and often do not provide an excessive amount of foam. Moreover, current solid and liquid based cleansing products are difficult to customize in manufacture to individual consumer desires. This is because each customized product would have its own specific composition that would require changing manufacturing lines and/or modifying input and starting materials between each customized product, which is highly inefficient. Additionally, beneficial cosmetic ingredients can be difficult to incorporate due to their incompatibility with anionic surfactants. For example, cationic surfactants, oils, antibacterial agents, and other beneficial ingredients are used in low concentrations in cleansing products, or otherwise the cleansing products are substantially and/or completely free of these ingredients to prevent undesirable interactions with anionic surfactant(s) in the product. This prevents the inclusion of such additionally beneficial cosmetic ingredients in the cleansing product.

Accordingly, it is desirable to provide a personal care product that addresses one or more of the foregoing issues and a method for making such a personal care product. Furthermore, other desirable features and characteristics of the various embodiments described herein will become apparent from the subsequent detailed description and the appended claims, taken in conjunction with the accompanying drawings and this background.

BRIEF SUMMARY OF THE INVENTION

A method for making a personal care product and personal care products are provided herein. In accordance with an exemplary embodiment, the method for making the personal care product includes forming a first layer by an additive process. The first layer has a first composition that includes at least one filler component selected from the group of starch, bulking agent salt, granular acid, clay mineral, sorbitol, silica, titanium dioxide, and zinc oxide. A binder is applied to the first layer. A second layer is formed by the additive process overlying the binder. The second layer has a second composition that includes at least one filler component selected from the group of starch, bulking agent salt, granular acid, clay mineral, sorbitol, silica, titanium dioxide, and zinc oxide. At least one of the first composition and the second composition further includes at least one surfactant.

In accordance with an exemplary embodiment, the personal care product includes a first layer. The first layer includes at least one filler component selected from the group of starch, bulking agent salt, granular acid, clay mineral, sorbitol, silica, titanium dioxide, and zinc oxide. The first layer further includes at least one anionic surfactant. A second layer that is affixed to the first layer by a binder includes at least one filler component selected from the group of starch, bulking agent salt, granular acid, clay mineral, sorbitol, titanium dioxide, and zinc oxide. The second layer is free of anionic surfactant.

BRIEF DESCRIPTION OF THE DRAWINGS

The various embodiments will hereinafter be described in conjunction with the following drawing figures, wherein like numerals denote like elements, and wherein.

DETAILED DESCRIPTION OF THE INVENTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to personal care products and methods for making such personal care products. The exemplary embodiments taught herein provide a method for making a personal care product including forming a first layer by an additive process. The first layer has a first composition that includes at least one filler component selected from the group of starch, bulking agent salt, granular acid, clay mineral, sorbitol, silica, titanium dioxide, and zinc oxide. A binder is applied to the first layer. A second layer is formed by the additive process overlying the binder. The second layer includes at least one filler component selected from the group of starch, bulking agent salt, granular acid, clay mineral, sorbitol, silica, titanium dioxide, and zinc oxide. The first composition and/or the second composition further includes at least one surfactant.

In an exemplary embodiment, advantageously by forming the first layer and the second layer by the additive process, each layer can be independently formulated with different or identical compositions. This allows for customization of the personal care product as well as the ability to include generally incompatible cosmetic ingredients in different layers of the personal care product. Furthermore, advantageously such methods allow for the production of personal care products with low water contents, and therefore lower carbon footprints and higher stability of cosmetic ingredients susceptible to degradation in high water content formulations.

Figure 1:
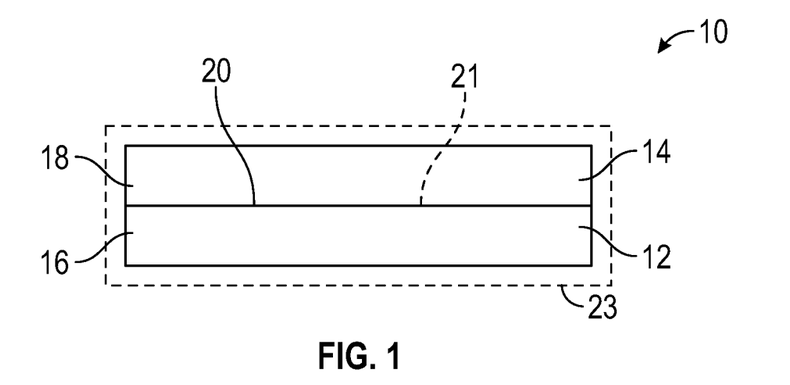
FIG. 1 illustrates a side view of a personal care product having a plurality of layers in accordance with an exemplary embodiment.

Referring to FIG. 1, illustrates a side view of a personal care product 10 having a plurality of layers 12, 14 in accordance with an exemplary embodiment. The layers 12, 14 are affixed to each other to form a stack with layer 14 overlying layer 12 (or vice versa depending on the orientation of the personal care product 10). The personal care product 10 may further include a protective coating 23 that surrounds at least a portion of the personal care product 10. In an exemplary embodiment, the personal care product 10 is in the form of a solid or packed solid personal care product such as a tablet or the like. The personal care product 10 may be in the form of a single-use personal cleansing product or, alternatively, may be concentrated in the form of a tablet that can be added to water and diluted to form, for example, a liquid personal care composition. Although the personal care product 10 is illustrated as having two layers, it is to be understood that various alternate embodiments of the personal care product 10 include the personal care product 10 having more than two layers, such as three, four, five, or more layers, but no less than two layers. It is also to be understood that each layer 12, 14 can include a plurality of layer portions that have independent or the same composition as the other layer portions of that respective layer 12, 14. For example, the layer portions of a layer 12, 14 may form a checkerboard pattern within the layer 12, 14 so that each layer portion (e.g., checkerboard square) has an independent composition that may be the same as or different from the compositions of the other layer portions (e.g., checkerboard squares) of that layer 12, 14. In an exemplary embodiment, each layer 12, 14 has a thickness of from about −0.1 millimeters to about 10 millimeters. In an exemplary embodiment, the personal care product 10 has a thickness of from about 0.2 millimeters to about 50 millimeters.

As will be discussed in further detail below, a binder 20 is applied between the layers 12 and 14, thereby adhering or otherwise affixing them to each other. For example, applying the binder 20 over layer 12 causes the surface of the layer 12 to become sticky and/or tacky such that it provides adhesive characteristics to the surface to promote better bonding and/or adhesion when the layer 14 is overlaid. In an exemplary embodiment, the binder 20 forms a binder layer 21 between the layers 12 and 14. Alternatively, the binder 20 may be partially and/or fully absorbed into the layers 12 and 14, for example resulting in a concentration gradient of the binder 20 into the layers 12 and 14 or may be homogenously dispersed throughout the layers 12 and 14. The amount of binder 20 applied between layers is enough to encourage adhesion of the layers 12 and 14, but is minimized to maintain structure and integrity of the layers 12 and 14 by, for example, not over-wetting the layers 12 and 14. Additionally, the binder 20 may be applied to the personal care product 10 to provide the protective coating 23. In an exemplary embodiment, the binder 20 includes at least one liquid component selected from the group of water, isopropyl alcohol, glycerin, coco-glucoside, sodium cocoyl glutamate, mineral oil, olive oil, propanediol, sunflower oil, and diisopropyl sebacate. In an exemplary embodiment, the liquid component is water. The binder 20 may further include at least one natural based polymer selected from the group of pullulan, sodium polyitaconate, dehydroxanthan gum, modified corn starch, maltodextrin, acacia Senegal gum, and xanthan gum. In an exemplary embodiment, the natural based polymer is present in the binder 20 in an amount of from about 1 to about 5 weight percent based on the total weight of the binder.

Each layer 12, 14 has an independent composition 16, 18 that can be identical to or different from the composition of any of the other layer(s) 14, 12. It is to be understood that as described herein, the components of and their weight percentages in the compositions 16 and 18 reflect the components of and their weight percentages in the compositions 16 and 18 without including the presence of any binder 20, although the binder 20 may or may not be present in the compositions 16 and 18. As such, the components of and their weight percentages in the compositions 16 and 18 represent the components of and their weight percentages in the compositions 16 and 18 without and/or prior to application of any binder 20.

The compositions 16 and 18 each include at least one filler component. As will be discussed in further detail below, in an exemplary embodiment, the filler component(s) are present in a fused or continuous matrix form such as in the form of a solid that was previously melted and subsequently allowed to solidify. Alternatively, the filler component(s) can be present in a solid particulate form. In an exemplary embodiment, the filler component(s) are selected from the group of starch such as potato starch, tapioca starch, and the like, bulking agent salt such as magnesium stearate, sodium bicarbonate, calcium carbonate, and the like, granular acid such as tartaric acid, citric acid, and the like, clay mineral such as kaolin, montmorillonite, bentonite, and the like, sorbitol, silicon dioxide, silicate such as magnesium aluminum silicate, calcium silicate, and the like, titanium dioxide, and zinc oxide. In an exemplary embodiment, the filler component(s) are present in the compositions 16 and 18 in a total amount of from about 0.1 to about 99.9 weight percent based on the total weight of the respective composition 16, 18.

In an exemplary embodiment, the compositions 16 and 18 each include tapioca starch and potato starch. Natural starch is comprised of amylose which is linear and amylopectin which is branched. Starches from different sources contain different proportions of these components which contribute to different properties. Additionally, the source of the starch, e.g. potato or tapioca leads to different starches having different particle shapes and sizes. These properties of various starches influence the end results of formulating with these raw materials. For example, tapioca starch typically cannot be used alone because it becomes too compact and cannot be broken apart easily.

Corn starch has irregular polyhedron shaped granules having a diameter of from about 5 to about 20 µm, while rice starch also has irregular polygon shaped particles having a size of about 3 to about 8 µm. The smaller sized particles and irregular shapes provide a rougher perception to the final product instead of a soft, powdery crumble.

The compositions 16 and 18 are typically free of corn and/or rice starch and/or any other non-potato or non-tapioca starch. In various embodiments, the compositions 16 and 18 each include less than 5, 4, 3, 2, 1, 0.5, or 0.1, weight percent of corn and/or rice starch and/or any other non-potato or non-tapioca starch based on a total weight of the respective composition 16, 18. In other embodiments, the compositions 16 and 18 are each completely free of corn and/or rice starch and/or any other non-potato or non-tapioca starch. In various non-limiting embodiments, it is contemplated that all values and ranges of values, both whole and fractional, between and including the aforementioned values, can be utilized herein.

In this disclosure, potato starch and tapioca starch are used in combination to provide strength to the personal care product 10 as well as a gentle crumble and soft feel. Potato starch has one of the largest particle sizes of native starches averaging from about 18 to about 60 μm. The larger particles are spherical and smooth in shape, giving a very silky skin feel due to the ball bearing effect. Tapioca starch has irregular round spheres with smaller particle sizes of from about 5 to about 25 μm. The combination of the large and smaller particles allows for close packing and interaction.

In various embodiments, the tapioca starch has a moisture level of less than about 15 wt. %. The potato starch may have a maximum moisture level of about 205 mg water/g of starch. Tapioca starch is typically obtained from the roots of Manihot esculenta and includes primarily amylose and amylopectin. Potato starch is a polysaccharide obtained from the potato and may be alternatively described as *Solanum tuberosum* starch.

In various embodiments, the tapioca starch is present in an amount of from at least about 1, 5, 10, 15, 20, 25, 30, 35, 40, 45, 50, 55, 60, 65, 70, 75, 80, 85, 90, 95, or up to about 99, weight percent based on the total weight percent of the respective composition 16, 18. In other embodiments, the tapioca starch is present in an amount of from about 10 to about 60, about 15 to about 55, about 20 to about 50, about 25 to about 45 weight percent based on the total weight percent of the respective composition 16, 18. In various non-limiting embodiments, it is contemplated that all values and ranges of values, both whole and fractional, between and including the aforementioned values, can be utilized herein.

In various embodiments, the potato starch is present in an amount of from at least about 1, 5, 10, 15, 20, 25, 30, 35, 40, 45, 50, 55, 60, 65, 70, 75, 80, 85, 90, 95, or up to about 99, weight percent based on the total weight percent of the respective composition 16, 18. In other embodiments, the potato starch is present in an amount of from about 10 to about 60, about 15 to about 55, about 20 to about 50, about 25 to about 45 weight percent based on the total weight percent of the respective composition 16, 18. In various non-limiting embodiments, it is contemplated that all values and ranges of values, both whole and fractional, between and including the aforementioned values, can be utilized herein.

The weight percent of the tapioca starch as related to the potato starch is not particularly limited. In various embodiments, the tapioca starch is present in an amount of about 0.1, 0.5, 1, 5, 10, 15, 20, 25, 30, 35, 40, 45, 50, 55, or 60 weight percent based on the total weight of the respective composition 16, 18 while the potato starch is present in an amount of about 0.1, 0.5, 1, 5, 10, 15, 20, 25, 30, 35, 40, 45, 50, 55, or 60 weight percent based on the total weight of the respective composition 16, 18. In various non-limiting embodiments, it is contemplated that all values and ranges of values, both whole and fractional, between and including the aforementioned values, can be utilized herein. All combinations of the above are also hereby expressly contemplated.

The weight ratio of the tapioca starch to the potato starch is not particularly limited. In various embodiments, the weight ratio of the tapioca starch to the potato starch may be from about 1:about 99 to about 99:about 1. In other embodiments, the weight ratio of the tapioca starch to the potato starch may be from about 1:5 to about 5:1, about 1:4 to about 4:1, about 1:3 to about 3:1, about 1:2 to about 2:1, or about 1:1. In various non-limiting embodiments, it is contemplated that all values and ranges of values, both whole and fractional, between and including the aforementioned values, can be utilized herein. All combinations of the above are also hereby expressly contemplated.

In an exemplary embodiment, the compositions 16 and 18 may independently include at least one surfactant. Examples of surfactants include anionic surfactants, amphoteric surfactants, nonionic surfactants, and cationic surfactants.

Anionic surfactants provide excellent cleansing and generate good foam volume. It is desirable to provide high foaming and good cleansing while remaining gentle and mild to the skin. Anionic surfactants as contemplated herein are not particularly limited and may be any known in the art.

In one embodiment, the anionic surfactant is an alkyl sulfate having a long chain hydrocarbon (e.g. $C_6$-$C_{20}$) attached to a sulfonate group. In another embodiment, the personal care product 10 is free of alkyl sulfates. Various non-limiting examples of alkyl sulfates include sodium lauryl sulfate, sodium laureth sulfate, sodium dodecyl sulfate, and the like.

To reduce skin irritation while achieving the desired performance, gentle anionic surfactants can be leveraged as well as combinations of anionic surfactants with amphoteric surfactants as secondary surfactants.

In various embodiments, suitable anionic surfactants include mild surfactants that are chosen from acyl glutamates, acyl isethionates, sarcosinates, taurates, and combinations thereof.

Acyl glutamates are salts of glutamic acid and are either monovalent or divalent having the general structure:

wherein R is a linear or branched, saturated or unsaturated, alkyl chain having from about 8 to about 30 carbon atoms. Various non-limiting examples of suitable glutamates include TEA-Cocoyl Glutamate, Sodium Lauroyl Glutamate, Sodium Cocoyl Glutamate, Potassium Cocoyl Glutamate, Glutamic acid, Cocoyl Glutamic acid, Stearoyl Glutamic acid.

Acyl isethionates are the esters of alkanoic acids and isethionic acids with the general formula:

wherein R is a linear or branched, saturated or unsaturated, alkyl chain having from about 8 to about 30 carbons. Various non-limiting examples of suitable isethionates include sodium cocoyl isethionate, sodium cocoyl methyl isethionate, sodium isethionate, sodium lauroyl isethionate, sodium lauryl methyl isethionate, sodium methyl isethionate, sodium myristoyl isethionate, sodium oleoyl isethionate.

Sarcosinates are a class of anionic surfactants formed from the acylation of glycine and have the general structure:

wherein R is an alkyl group and X is a cationic salt species, such as $Na^+$ or $TEA^+$. Various non-limiting examples of suitable sarcosinates include lauroyl sarcosine, potassium cocoyl sarcosinate, sodium cocoyl sarcosinate, sodium lauroyl sarcosinate, potassium lauroyl sarcosinate, TEA-lauryl sarcosinate.

Taurates are derived from taurine by acylation available as salts and generally have the structure:

wherein R is a linear or branched, saturated or unsaturated alkyl chain having from about 8 to about 30 carbons. Various non-limiting examples of suitable taurates include sodium methyl lauroyl taurate, sodium methyl cocoyl taurate, sodium methyl oleoyl taurate, potassium cocoyl taurate.

In one embodiment, suitable anionic surfactants are chosen from a glutamic acid derivative, an isethionate derivative, an acyl glutamate, an acyl isethionate, a sarcosinate, a taurate, salts thereof, and combinations thereof.

In another embodiment, the glutamic acid derivative is chosen from sodium cocoyl glutamate, potassium cocoyl glutamate, glutamic acid, sodium lauroyl glutamate, and combinations thereof.

In another embodiment, the isethionate derivative is chosen from esters of alkanoic acids and isethionic acids or salts thereof.

In still another embodiment, the isethionate derivative is chosen from sodium lauryl methyl isethionate, sodium cocoyl isethionate, sodium isethionate, sodium lauroyl isethionate, salts thereof, and combinations thereof.

In a further embodiment, the sarcosinate is chosen from lauroyl sarcosine, sodium cocoyl sarcosinate, sodium lauroyl sarcosinate, potassium cocoyl sarcosinate, and combinations thereof.

In another embodiment, the taurate is chosen from sodium methyl lauroyl taurate, sodium methyl cocoyl taurate, potassium cocoyl taurate, and combinations thereof.

In another embodiment, anionic surfactant(s) are present in an amount of from about 1 to about 80, about 2 to about 60, or about 10 to about 40 weight percent actives based on the total weight of the respective composition 16, 18. In other embodiments, anionic surfactant(s) are present in an amount of from 0.01 to about 80, about 0.05 to about 75, about 0.1 to about 70, about 5 to about 50, or about 10 to about 40 weight percent actives based on the total weight of the respective composition 16, 18. In various non-limiting embodiments, it is contemplated that all values and ranges of values, both whole and fractional, between and including the aforementioned values, can be utilized herein.

Amphoteric surfactants as contemplated herein may include both true amphoteric surfactants and zwitterionic compounds, where the true charge of the molecule is dependent on the pH of the solution. Suitable amphoteric surfactants are not particularly limited and may be any known in the art.

The most common class of amphoteric molecules are betaines with a quaternized nitrogen function and a carboxylic function with the following structure:

wherein R is a linear or branched, saturated or unsaturated alkyl chain having from about 8 to about 30 carbons. Various non-limiting examples of suitable betaines may include coco betaine, cocamidopropyl betaine, lauryl betaine, cetyl betaine, lauramidopropyl betaine, oleyl betaine, meadowfoam amidopropyl betaine, babassu amidopropyl betaine.

In one embodiment, suitable amphoteric surfactants are betaines having quaternized nitrogen functionality and carboxylic functionality.

In another embodiment, suitable amphoteric surfactants are chosen from coco betaine, cocamidopropyl betaine, lauryl betaine, or combinations thereof.

In various embodiments, amphoteric surfactant(s) are present in an amount of from about 0.1 to about 60, about 0.5 to about 40, or about 1 to about 10, weight percent actives based on the total weight of the respective composition 16, 18. In other embodiments, amphoteric surfactant(s) are present in an amount of from 0.01 to about 20, about 0.05 to about 15, about 0.1 to about 10, or about 2 to about 8 weight percent actives based on the total weight of the respective composition 16, 18. In various non-limiting embodiments, it is contemplated that all values and ranges of values, both whole and fractional, between and including the aforementioned values, can be utilized herein.

Suitable nonionic surfactants are not particularly limited and may be any known in the art. Various non-limiting examples of suitable nonionic surfactants include alkylpolyglucosides such as caprylyl/Capryl Glucoside, Cocoglucoside, and the like, alkanolamides such as Coamide MEA, Stearamide MIPA, and the like, ethoxylates such as Polysorbate 20, PEG-80 sorbitan monolaurate, and the like, amine oxides such as lauramidopropylamine aoxide, laramine oxide, and the like.

In various embodiments, nonionic surfactant(s) are present in an amount of from about 0.1 to about 60, about 0.5 to about 40, or about 1 to about 10, weight percent actives based on the total weight of the respective composition 16, 18. In other embodiments, nonionic surfactant(s) are present in an amount of from 0.01 to about 20, about 0.05 to about 15, about 0.1 to about 10, or about 0.5 to about 5 weight percent actives based on the total weight of the respective composition 16, 18. In various non-limiting embodiments, it is contemplated that all values and ranges of values, both whole and fractional, between and including the aforementioned values, can be utilized herein.

Suitable cationic surfactants are not particularly limited and may be any known in the art. Various non-limiting examples of suitable cationic surfactants include alkyl quaternary ammonium compounds such as cetrimonium chloride, steartrimonium chloride, and the like.

In various embodiments, cationic surfactant(s) are present in an amount of from about 1 to about 80, about 2 to about 60, or about 5 to about 40, weight percent actives based on the total weight of the respective composition 16, 18. In other embodiments, amphoteric surfactant(s) are present in an amount of from 0.01 to about 80, about 0.05 to about 60, about 0.1 to about 50, or about 10 to about 40 weight percent actives based on the total weight of the respective composition 16, 18. In various non-limiting embodiments, it is contemplated that all values and ranges of values, both whole and fractional, between and including the aforementioned values, can be utilized herein.

In an exemplary embodiment, the compositions 16 and 18 may independently include actives such as a vitamin(s), a vegetable oil(s), an antidandruff agent(s), and an antibacterial agent(s). Suitable vitamins, vegetable oils, and antibacterial agents are not particularly limited and may be any known in the art.

Various non-limiting examples of suitable vitamins include vitamin A (retinyl palmitate), vitamin E (tocopheryl Acetate, Tocopherol), and Vitamin B3 (Niacinamide). In an exemplary embodiment, vitamin(s) are present in an amount of from about 0.01 to about 1.00 weight percent based on the total weight of the respective composition 16, 18.

Various non-limiting examples of suitable vegetable oils include apricot oil, sunflower oil, coconut oil, avocado oil, pomegranate seed oil, almond oil, argan oil, lavender oil, shea butter, cocoa butter, mango butter, and the like. In an exemplary embodiment, the vegetable oils are present in an amount of from about 0.01 to about 10 weight percent, such as about 1.00 weight percent based on the total weight of the respective composition 16, 18.

Various non-limiting examples of suitable antidandruff agents include zinc pyrithione, salicylic acid, Ketoconazole, Selenium Sulfide, and the like. In an exemplary embodiment, the antidandruff agents are present in an amount of from about 0.5 to about 5 weight percent based on the total weight of the respective composition 16, 18.

Various non-limiting examples of suitable antibacterial agents include benzalkonium chloride, benzethonium chloride, chloroxylenol, chlorohexidine, and the like. In an exemplary embodiment, the antibacterial agents are present in an amount of from about 0.1 to about 0.5 weight percent based on the total weight of the respective composition 16, 18.

In an exemplary embodiment, the compositions 16 and 18 may independently include additives such as fragrance, glycerin, conditioning agents, cellulosic polycationic compounds polyquaternium-10, polyquaternium-24, polyquaternium-6, and polyquaternium-7, cationic guars such as hydroxypropyltrimonium guard, quaternized protein hydrolysates such as cassia hydroxypropyltrimonium chloride, fatty alcohols such as cetearyl alcohol, and humectants such as sorbitol and propanediol. In an exemplary embodiment, the additives are present in a total amount of from about 0.1 to about 10 weight percent based on the total weight of the respective composition 16, 18.

In an exemplary embodiment, at least one of the compositions 16 and 18 of the personal care product 10 include an anionic surfactant(s). For example, one of the compositions 16 and 18 includes an anionic surfactant(s) and the other of the compositions 16 and 18 is free of anionic surfactant. Accordingly and as will be discussed in further detail below, cosmetically acceptable ingredients that are incompatible with the anionic surfactant can be included in the compositions of the layers that do not contain anionic surfactant while the compositions of the layers that contain anionic surfactant can be free of the incompatible ingredients.

In an exemplary embodiment, any of the compositions 16, 18 that include anionic surfactant may further include an amphoteric surfactant(s) and/or a nonionic surfactant(s). Additionally, any of the compositions 16, 18 that include anionic surfactant may be free of cationic surfactant, antibacterial agent, vegetable oil, and/or vitamin C.

Likewise, any of the compositions 16, 18 that are free of anionic surfactant may include at least one cosmetically acceptable ingredient selected from the group of cationic surfactant, antibacterial agent, Vitamin C, and vegetable oil. For example, any of the compositions 16, 18 that are free of anionic surfactant may include cationic surfactant.

Figure 2:
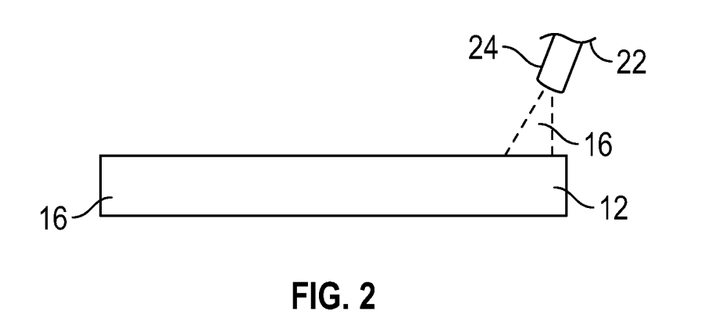
FIG. 2 illustrates a method for making a personal care product during an early stage of its fabrication in accordance with an exemplary embodiment.
Figure 3:
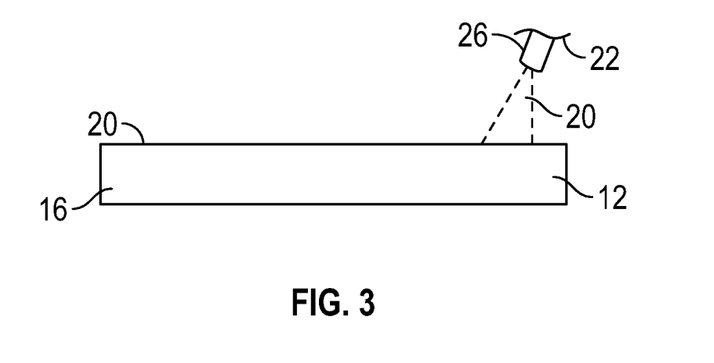
FIG. 3 illustrates a method for making a personal care product during a further advanced stage of its fabrication in accordance with an exemplary embodiment.
Figure 4:
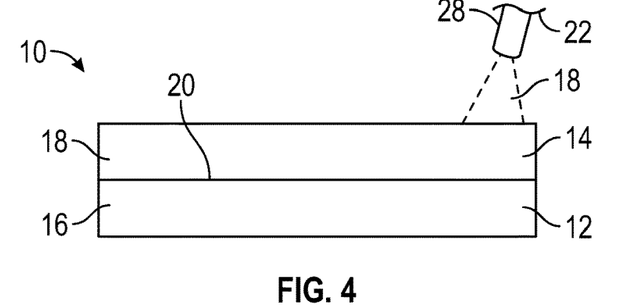
FIG. 4 illustrates a method for making a personal care product during a further advanced stage of its fabrication in accordance with an exemplary embodiment.

FIGS. 2-4 illustrate a method for making the personal care product 10 in accordance with an exemplary embodiment. Referring to FIG. 2, the first layer 12 is formed by an additive process. Various non-limiting examples of additive processes include material extrusion such as fused deposition modelling, powder bed fusion, material jetting, binder jetting, and three-dimensional (3-D) printing. In an exemplary embodiment, the additive process 22 is a 3-D printing process that utilized a digital Computer Aided Design (CAD) and/or Computer Aided Manufacturing (CAM) file to deposit successive layers of a 3-D printable composition. The 3-D printing process includes a controller that is operative to receive input commands and to communicate the input commands to one or more part-building tools 24, 26, and/or 28 to deposit the successive layers.

For the first layer 12, the part-building tool 24 may be, for example, an extrusion head, an inkjet-type printer head, a sprayer, or any other 3-D printer head known in the art. In an exemplary embodiment, the part-building tool 24 is coupled to a hopper or other holding vessel that is configured to hold the composition 16. In an exemplary embodiment, the composition 16 is in particulate form before being formed into the first layer 12. The part-building tool 24 may then form the first layer 12 by depositing, placing, spreading, and/or extruding the composition 16 out of the part-building tool 24. In an exemplary embodiment, the part-building tool 24 includes an extruder head and the composition 16 is heated and extruded through the extruder head to form a molten composition (e.g., molten quantity of composition 16). As used herein, the phrase "molten composition" refers to compositions having rheological flow characteristics resultant from, for example, the application of heat, friction, or mechanical work. The molten composition may be subsequently cooled and/or solidified to form the first layer 12. Alternatively, the composition 16 may be disposed by the part-building tool 24 in particulate form to form the first layer 12. In an exemplary embodiment, the molten composition is kept within a temperature range that does not impart non-reversible chemical changes to the composition, such as the irreversible oxidative process of burning.

Referring to FIG. 3, the binder 20 is applied to the first layer 12. For example, the binder 20 may be applied by the additive process, or by another process to the upper, exposed surface of the first layer 12. In an exemplary embodiment, the binder 20 is applied by the additive process via a part-building tool 26. The part-building tool 26 may be the same part-building tool 24 or an additional part-building tool separate from the part-building tool 24. The part-building tool 26 may be, for example, an extrusion head, an inkjet-type printer head, a sprayer, or any other 3-D printer head known in the art. In an exemplary embodiment, the part-building tool 26 is coupled to a holding vessel that is configured to hold the binder 20. In an exemplary embodiment, the part-building tool 26 is a sprayer, an atomizer, or the like configured to spray a relatively low viscosity liquid (e.g., water, aqueous solution, or the like). The part-building tool 26 applies the binder 20 to the first layer 12. For example, the part-building tool 26 sprays, atomizes, and/or disperses the binder 20 over the first layer 12.

Referring to FIG. 4, the second layer 14 is formed by the additive process 22 overlying the binder 20 and the first layer 12 via a part-building tool 28. The part-building tool 28 may be the same part-building tool 24 and/or 26 or an additional part-building tool separate from the part-building tool(s) 24, 26. The part-building tool 28 may be, for example, an extrusion head, an inkjet-type printer head, a sprayer, or any other 3-D printer head known in the art. In an exemplary embodiment, the part-building tool 28 is coupled to a hopper or other holding vessel that is configured to hold the composition 18. In an exemplary embodiment, the composition 18 is in particulate form before being formed into the second layer 14. The part-building tool 28 may then form the second layer 14 by depositing, placing, spreading, and/or extruding the composition 18 out of the part-building tool 28 overlying the binder 20 and the first layer 12. In an exemplary embodiment, the part-building tool 28 includes an extruder head and the composition 18 is heated and extruded through the extruder head to form a molten composition (e.g., molten quality of composition 18). The molten composition may be subsequently cooled and/or solidified to form the second layer 14. Alternatively, the composition 18 may be disposed by the part-building tool 28 in particulate form to form the second layer 14 overlying the binder 20.

The following examples are illustrative and non-limiting, of the device, products and methods of the present disclosure. Suitable modifications and adaptations of the variety of conditions, formulations and other parameters normally encountered in the field and which are obvious to those skilled in the art in view of this disclosure are within the spirit and scope of the invention.

EXAMPLES

The following examples are provided for illustration purposes only and are not meant to limit the various embodiments of the present disclosure in any way.

TABLE 1

| Component | Layer A (wt. %) | Layer B (wt. %) | Layer C (wt. %) | Layer D (wt. %) | Layer E (wt. %) | Layer F (wt. %) |
|---|---|---|---|---|---|---|
| Potato Starch | 33 | — | 40 | 45 | 30 | 30 |
| Tapioca Starch | 33 | — | 40 | 45 | 30 | 30 |
| Anionic Surfactant | 15 | — | — | — | 35 | — |
| Fragrance | 0.75 | 1 | 1 | 1 | 1 | 1 |
| Amphoteric Surfactant | 5 | — | — | — | — | — |
| Glycerin | 5 | — | 5 | 5 | 5 | 5 |
| Nonionic Surfactant | 2 | — | — | — | — | — |
| Additional Conditioning Agents | 6.25 | — | — | — | — | — |
| Water | — | 94 | — | — | — | — |
| Natural Based Polymer | — | 5 | — | — | — | — |
| Cationic Surfactant | — | — | — | — | — | 35 |
| Cationic Conditioning Agents | — | — | — | — | — | 0.2 |
| Active Ingredients (e.g., vitamins, antibacterial agents, vegetable oils) | — | — | 2 | — | 2 | — |

Figure 5:
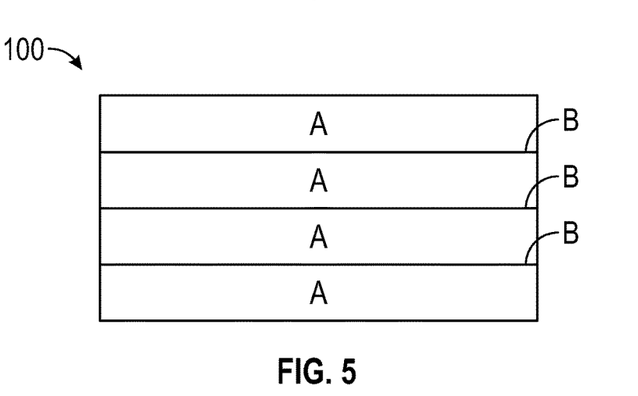
FIG. 5 illustrates a side view of a personal care product in accordance with an exemplary embodiment.
Figure 6:
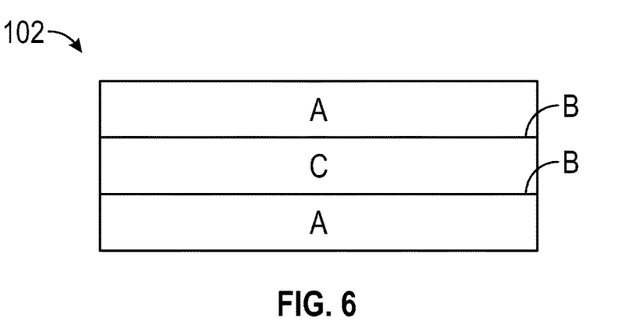
FIG. 6 illustrates a side view of a personal care product in accordance with another exemplary embodiment.
Figure 7:
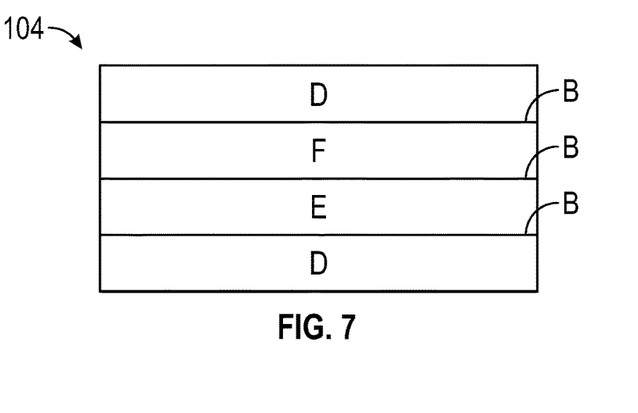
FIG. 7 illustrates a side view of a personal care product in accordance with yet another exemplary embodiment.

Referring to TABLE 1 and FIGS. 5-7, various exemplary compositions and exemplary personal care products are provided. TABLE 1 provides several examples of compositions that can be utilized to produce various layers of the personal care product. Layer B is the binder composition while Layers A, C, D, E, and F are alternatively useable compositions for layers of the personal care product. Layer A includes anionic surfactants and provides the general cleansing properties associated with cleansing products such as ability to remove oil, dirt, and/or residual personal care products upon topical application. Layer C is a layer that includes actives such as vitamins, antibacterial agents, and/or vegetable oils. This layer is free of anionic surfactants and cationic surfactants. Layer D is a bulk starch layer that provides integrity and protection to the personal care product. Layer E is a more concentrated anionic surfactant layer that may be used, for example, to increase the overall amount of anionic surfactants in the cleansing product. Layer F is a cationic surfactant layer that may be used, for example, to provide conditioning and/or moisturizing effects/benefits upon topical application.

FIG. 5 provides an exemplary personal care product 100 that includes a stack of layers A with binder applied between each adjacent layers A to affix the layers. In an exemplary embodiment, this personal care product 100 provides cleansing properties and the ability to customize, for example, fragrance(s), colorant(s), or other properties in each layer if desired.

FIG. 6 provides an exemplary personal care product 102 that includes Layer C disposed between two Layers A with binder applied between each adjacent layer to affix the layers. In an exemplary embodiment, this personal care product 102 provides cleansing properties with the additional benefit of incorporated actives that would otherwise be incompatibly added to the personal care product 102 if the such actives were not separated from the anionic surfactant(s) of Layer A.

FIG. 7 provides an exemplary personal care product 104 that includes Layers F and E disposed between two Layers D with binder applied between each adjacent layer to affix the layer. In an exemplary embodiment, this personal care product 104 provides cleansing properties with the additional benefit of protective bulk layers on the outside of the product and a cationic surfactant layer providing conditioning and moisturizing benefits to the personal care product.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:
1. A method for making a personal care product, the method comprising:
   forming a first layer using an additive process, wherein the first layer has a first composition that comprises at least one filler component selected from the group consisting of a starch, a bulking agent salt, a granular acid, a clay mineral, sorbitol, silica, titanium dioxide, and zinc oxide;

applying a binder to the first layer; and forming a second layer overlying the binder using the additive process, wherein the second layer has a second composition that comprises at least one filler component selected from the group consisting of a starch, a bulking agent salt, a granular acid, a clay mineral, sorbitol, silica, titanium dioxide, and zinc oxide, and wherein one of the first composition or the second composition further comprises at least one anionic surfactant, and the other of the first composition or the second composition is free of the at least one anionic surfactant.

2. The method of claim 1, wherein the at least one anionic surfactant is present in an amount of from about 10 wt. % to about 40 wt. %, based on the total weight of the one of the first composition or the second composition that comprises the at least one anionic surfactant.

3. The method of claim 1, wherein the one of the first composition or the second composition that comprises the at least one anionic surfactant is free of cationic surfactant.

4. The method of claim 1, wherein the one of the first composition or the second composition that comprises the at least one anionic surfactant further comprises at least one additional surfactant selected from the group consisting of amphoteric surfactant and nonionic surfactant.

5. The method of claim 1, wherein the other of the first composition or the second composition that is free of anionic surfactant further comprises at least one cosmetically acceptable ingredient selected from the group consisting of a cationic surfactant, an antibacterial agent, vitamin C, and vegetable oil.

6. The method of claim 5, wherein the at least one cosmetically acceptable ingredient is selected from the group consisting of the cationic surfactant and the antibacterial agent.

7. The method of claim 6, wherein the antibacterial agent is selected from the group consisting of benzalkonium chloride, benzethonium chloride, chloroxylenol, chlorohexidine, and any combination thereof.

8. The method of claim 6, wherein the cationic surfactant is present in the other of the first composition or the second composition that is free of anionic surfactant in an amount of from about 10 wt. % to about 40 wt. %, based on the total weight of the other of the first composition or the second composition that is free of anionic surfactant.

9. The method of claim 1, wherein the binder comprises at least one liquid component selected from the group consisting of water, isopropyl alcohol, glycerin, coco-glucoside, sodium cocoyl glutamate, mineral oil, olive oil, propanediol, sunflower oil, and diisopropyl sebacate.

10. The method of claim 9, wherein the binder further comprises at least one natural-based polymer selected from the group consisting of pullulan, sodium polyitaconate, dehydroxanthan gum, modified corn starch, maltodextrin, acacia senegal gum, xanthan gum, and any combination thereof.

11. The method of claim 1, wherein the additive process is a three-dimensional printing process.

12. The method of claim 11, wherein;

forming the first layer using the additive process comprises depositing a first molten quantity of the first composition using the three-dimensional printing process and allowing the first molten quantity to solidify to form the first layer, applying the binder to the first layer comprises applying the binder to the first layer using the three-dimensional printing process or a spray process, and forming the second layer using the additive process comprises depositing a second molten quantity of the second composition overlying the binder using the three-dimensional printing process and allowing the second molten quantity to solidify to form the second layer.

13. The method of claim 1, wherein the first layer has a thickness of from about 0.1 millimeters to about 10 millimeters, and the second layer has a thickness of from about 0.1 millimeters to about 10 millimeters.

14. The method of claim 1, wherein the at least one filler component of the first composition comprises at least one starch, and the at least one filler component of the second composition comprises at least one starch.

15. The method of claim 14, wherein the at least one starch of the first composition comprises tapioca starch and potato starch, and wherein the at least one starch of the second composition comprises tapioca starch and potato starch.

16. The method of claim 14, wherein the at least one starch of the first composition is present in an amount of from about 20 wt. % to about 95 wt. %, based on the total weight of the first composition, and the at least one starch of the second composition is present in an amount of from about 20 wt. % to about 95 wt. %, based on the total weight of the second composition.

17. A personal care product formed by the method of claim 1.

18. A personal care product, comprising:

a first layer comprising:
at least one filler component selected from the group consisting of a starch, a bulking agent salt, a granular acid, a clay mineral, sorbitol, silica, titanium dioxide, and zinc oxide; and
at least one anionic surfactant;

a binder; and a second layer that is affixed to the first layer by the binder, the second layer comprising:
at least one filler component selected from the group consisting of a starch, a bulking agent salt, a granular acid, a clay mineral, sorbitol, silica, titanium dioxide, and zinc oxide,
wherein the second layer is free of anionic surfactant.

19. The method of claim 15, wherein:

the potato starch has particle sizes of from about 18 μm to about 60 μm, and the tapioca starch has particle sizes of from about 5 μm to about 25 μm.

20. The personal care product of claim 18, further comprising a protective coating surrounding at least a portion of the personal care product.

* * * * *